(12) United States Patent
Collins et al.

(10) Patent No.: US 10,556,284 B2
(45) Date of Patent: Feb. 11, 2020

(54) METHOD OF FORMING ELECTRICAL CONNECTIONS WITH SOLDER DISPENSING AND REFLOW

(71) Applicant: Seagate Technology LLC, Cupertino, CA (US)

(72) Inventors: Aaron Collins, Minneapolis, MN (US); Paul Davidson, Eden Prairie, MN (US); Ralph Smith, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 697 days.

(21) Appl. No.: 14/833,549

(22) Filed: Aug. 24, 2015

(65) Prior Publication Data
US 2017/0056995 A1  Mar. 2, 2017

(51) Int. Cl.
*B23K 1/005* (2006.01)
*B23K 1/00* (2006.01)

(52) U.S. Cl.
CPC .......... *B23K 1/0056* (2013.01); *B23K 1/0016* (2013.01)

(58) Field of Classification Search
CPC ............... B23K 3/0623; B23K 1/0016; B23K 2201/42; B23K 26/1476; B23K 2201/40; B23K 26/03; B23K 3/0607; B23K 1/00; B23K 26/032; B23K 26/14; B23K 26/1464; B23K 1/0056; H01L 2224/11334; H01L 2224/742; H01L 2224/11003; H01L 2224/11318; H01L 2224/81224
USPC .... 219/121.85, 121.63–65, 121.68, 74, 85.1, 219/117.1, 85.21; 228/41, 246, 219, 260, 228/8; 438/615, 106; 250/208.2; 257/E21.499, E21.508
See application file for complete search history.

(56) References Cited

U.S. PATENT DOCUMENTS

| | | | |
|---|---|---|---|
| 6,336,581 B1 | 1/2002 | Tuchiya et al. | |
| 7,360,679 B2 * | 4/2008 | Azdasht | B23K 1/0056 228/256 |
| 7,619,856 B2 | 11/2009 | Matsumoto et al. | |
| 7,717,316 B2 | 5/2010 | Azdasht et al. | |
| 8,143,095 B2 * | 3/2012 | Honer | B81C 1/00301 257/E21.499 |
| 8,705,324 B2 | 4/2014 | Shivarama et al. | |
| 8,730,621 B2 | 5/2014 | Brandts et al. | |
| 8,881,967 B2 | 11/2014 | Matsumoto et al. | |

(Continued)

*Primary Examiner* — Dana Ross
*Assistant Examiner* — Joseph M Baillargeon
(74) *Attorney, Agent, or Firm* — Kagan Binder, PLLC

(57) ABSTRACT

A method for interconnecting multiple components of a head-gimbal assembly with a solder joint, including the steps of positioning a first component adjacent to a second component to provide a connection area between the first and second components, dispensing a solder sphere to a capillary tube comprising tapered walls, wherein the capillary tube is positioned with an exit orifice above the connection area between the first and second components, pressurizing the capillary tube until a predetermined pressure is reached, applying a first laser pulse to the solder sphere to provide a level of thermal energy to liquefy the solder sphere, detecting the movement of the liquefied solder sphere after it has exited the exit orifice of the capillary tube, and applying a second laser pulse to reflow the solder sphere to create the solder joint between the first and second components.

8 Claims, 7 Drawing Sheets

(56) References Cited

U.S. PATENT DOCUMENTS

2013/0256277 A1\* 10/2013 Li .................. B23K 1/0016
219/74
2016/0279725 A1\* 9/2016 Azdasht ............ B23K 1/0056

\* cited by examiner

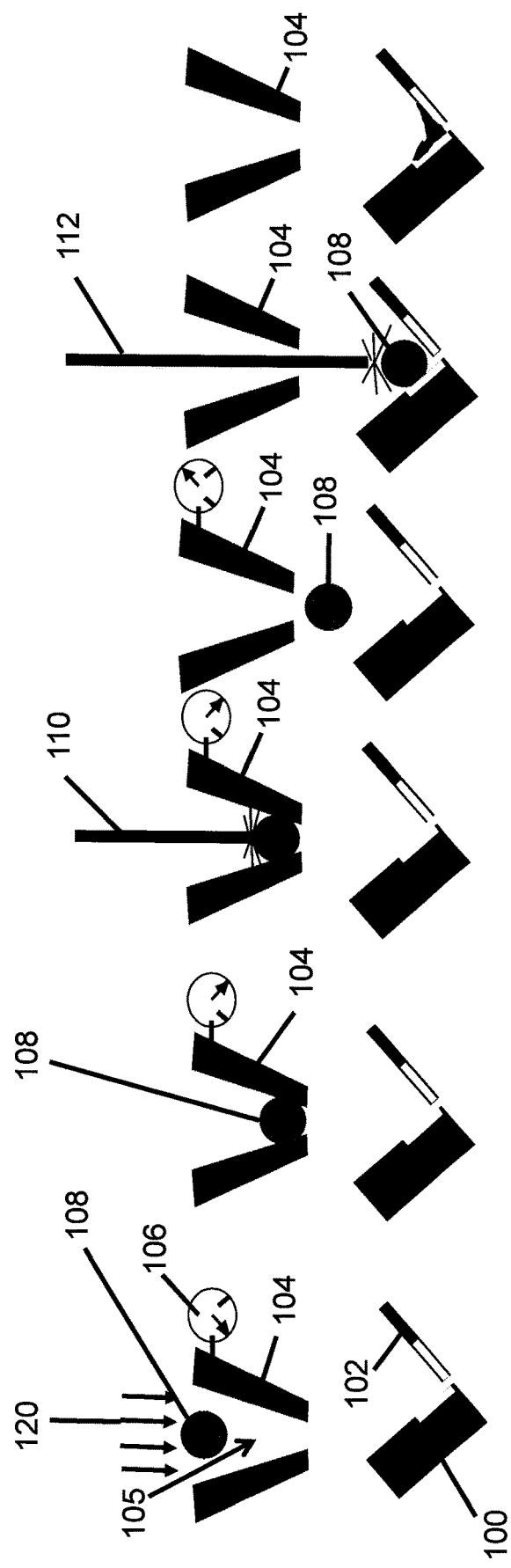

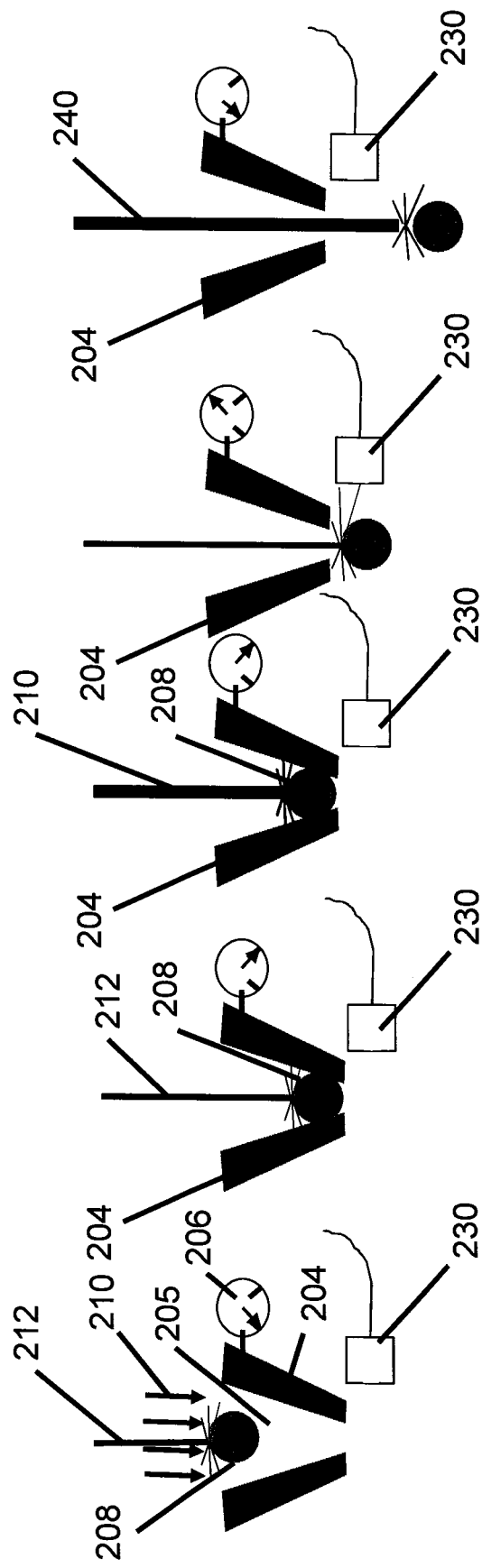

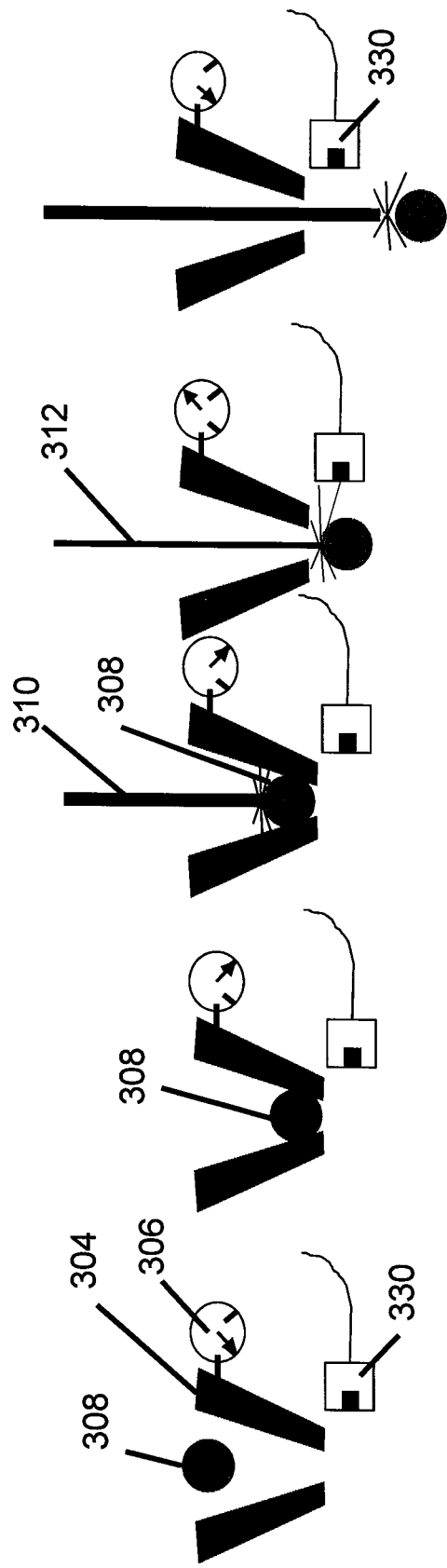

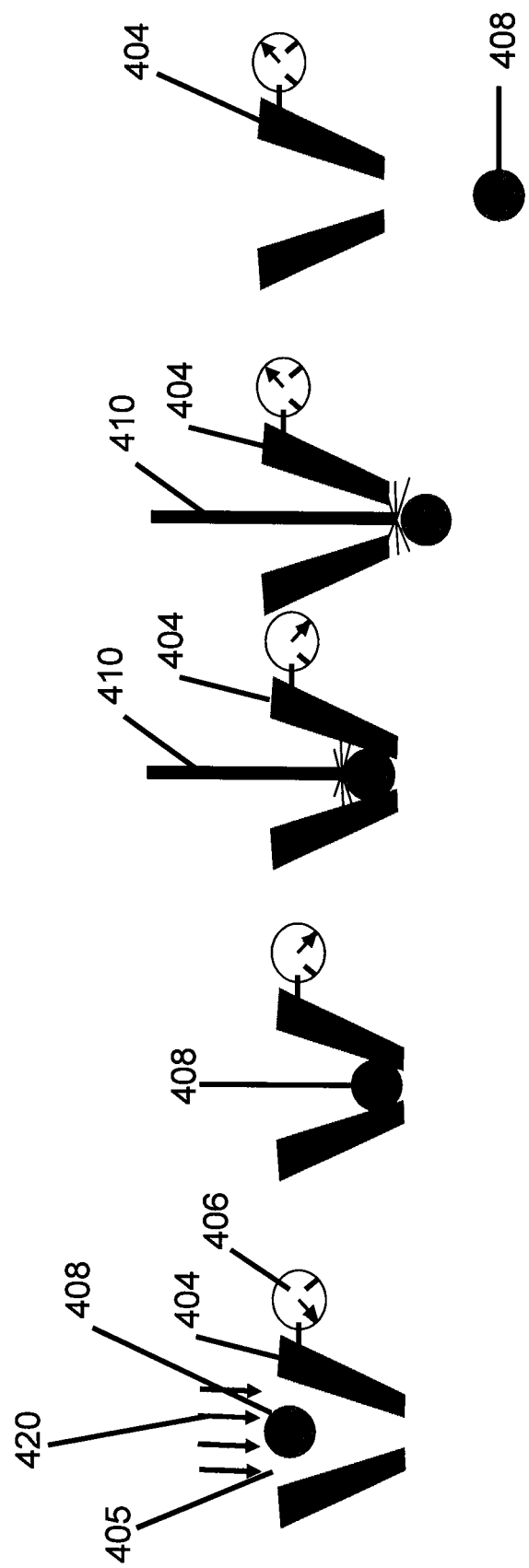

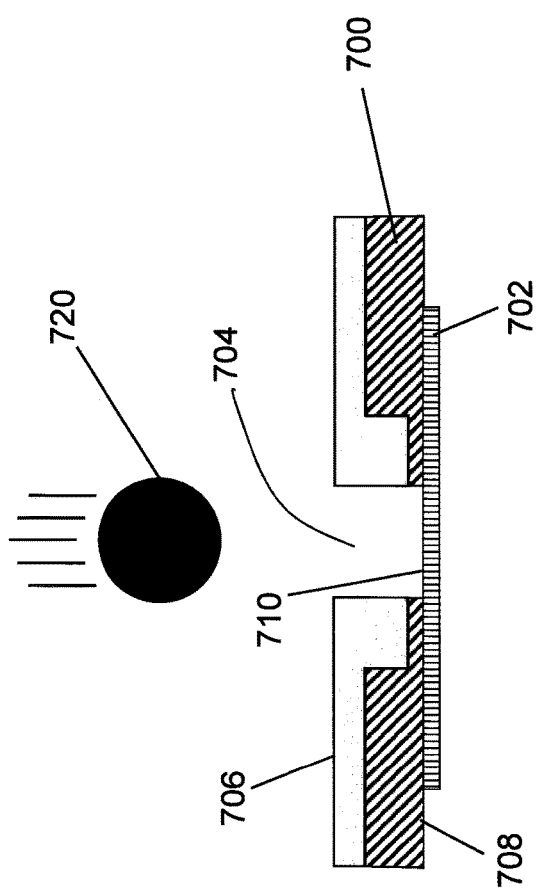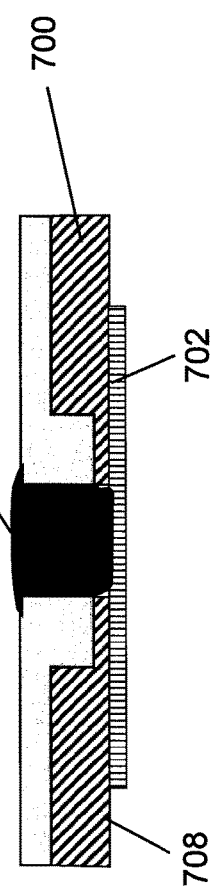

METHOD OF FORMING ELECTRICAL CONNECTIONS WITH SOLDER DISPENSING AND REFLOW

BACKGROUND

Hard disk drive (HDD) systems typically include one or more data storage disks with concentric tracks containing information. A transducing head carried by a slider is used to read from and write to a data track on a disk, wherein each slider has an air bearing surface that is supportable by a cushion of air generated by one of the rotating disks. The slider is carried by an arm assembly that includes an actuator arm and a suspension assembly, which can include a separate gimbal structure or can integrally form a gimbal.

As the density of data desired to be stored on disks continues to increase, more precise positioning of the transducing head and other components is becoming increasingly important. In many conventional systems, head positioning is accomplished by operating the actuator arm with a large scale actuation motor, such as a voice coil motor, to position a head on a flexure at the end of the actuator arm. A high resolution head positioning mechanism, or microactuator, is advantageous to accommodate the high data density.

The manufacturing of components of HDD systems often includes providing an electrical connection via solder material between various components, either by direct connection between such component surfaces, or by connecting bonding pads attached to at least one of the component surfaces. One particular current process for connection involves the use of a single square wave laser pulse that is applied to a solder ball, with the amount of laser energy applied by the single pulse being balanced to provide for both the thermal energy for initial melting of the solder sphere as well as the desired amount of thermal energy for reflow to provide a satisfactory connection between components. The use of such a single high intensity pulse results in the total thermal energy put into the solder sphere occurring in a relatively short time period (typically while still in a capillary and/or shortly after exiting the capillary) results in a considerable amount of heat conducted into the capillary wall. Additionally, since the reflow energy is put into the solder sphere as thermal energy, the final sphere temperature is far greater than that of the required melt temperature, which during the interconnect formation process can cause large amounts of the localized heat to transfer to a slider or other component when it impacts the surface. Thus, there is a desire to provide additional solder placement techniques that allow for accurate solder connections in high density applications.

SUMMARY

Aspects of the invention described herein are directed to the processing of solder materials to provide for accurate attachment and interconnect of sliders to their associated head gimbal assemblies in hard disk drives. Such methods and configurations are particularly beneficial with the continuing desire to decrease the size of electronic components in the data storage industry. In particular, aspects of the invention are directed to providing two distinct laser pulses to provide for jetting and reflow of a solder sphere in a thermal interconnect process. A number of different manners of measuring, detecting, and timing of the pulses are provided as steps within the methods of the invention.

In one aspect of the invention, a method is provided for interconnecting multiple components of a head-gimbal assembly with a solder joint, including the steps of positioning a first component adjacent to a second component to provide a connection area between the first and second components, dispensing a solder sphere to a capillary tube comprising tapered walls, wherein the capillary tube is positioned with an exit orifice above the connection area between the first and second components, pressurizing the capillary tube until a predetermined pressure is reached, applying a first laser pulse to the solder sphere to provide a level of thermal energy to liquefy the solder sphere until it falls from the exit orifice toward the connection area between the first and second components, detecting the movement of the liquefied solder sphere after it has exited the exit orifice of the capillary tube, and applying a second laser pulse to reflow the solder sphere to create the solder joint between the first and second components. In one aspect of the invention, the first and second components are positioned at an angle relative to each other, such that their respective edges are adjacent to each other. In another aspect of the invention, the first component includes a hole or aperture extending from a first surface to a second surface, and the second component is positioned so that its first surface contacts the second surface of the first component in the area surrounding the hole.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIGS. 3A-3F provide a schematic view of an embodiment of a series of steps for a soldering process of the invention;

FIGS. 4A-4E provide a schematic view of another embodiment of a series of steps for a soldering process of the invention;

FIGS. 5A-5E provide a schematic view of another embodiment of a series of steps for a soldering process of the invention;

FIGS. 6A-6E provide a schematic view of another embodiment of a series of steps for a soldering process of the invention; and FIGS. 7A-7B are schematic side views of another embodiment of the invention in which a first component has an aperture extending through it that can receive solder material.

DETAILED DESCRIPTION

Figure 1:
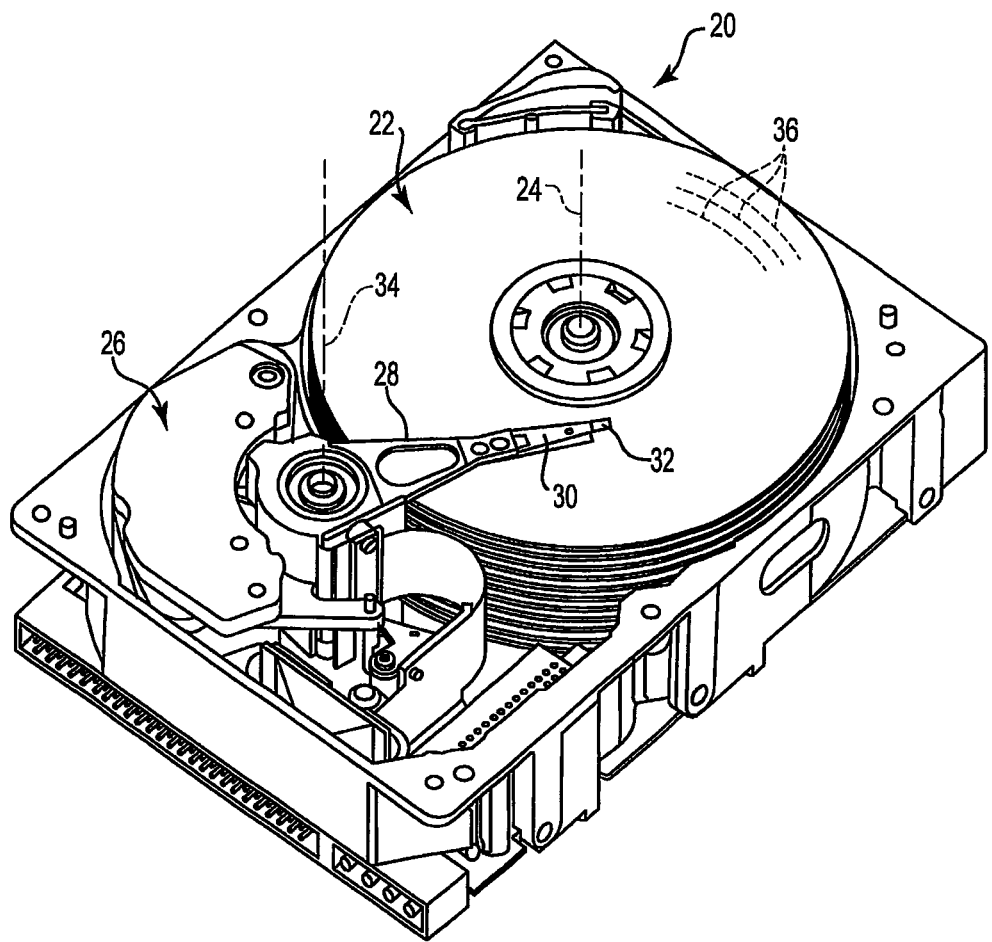
FIG. 1 is a perspective view of an exemplary hard disk drive (HDD) system.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided with additional actuator arms 28, suspension assemblies 30, and sliders 32 that carry read/write heads for reading and writing at top and bottom surfaces of each disk 22 in the stack.

Figure 2:
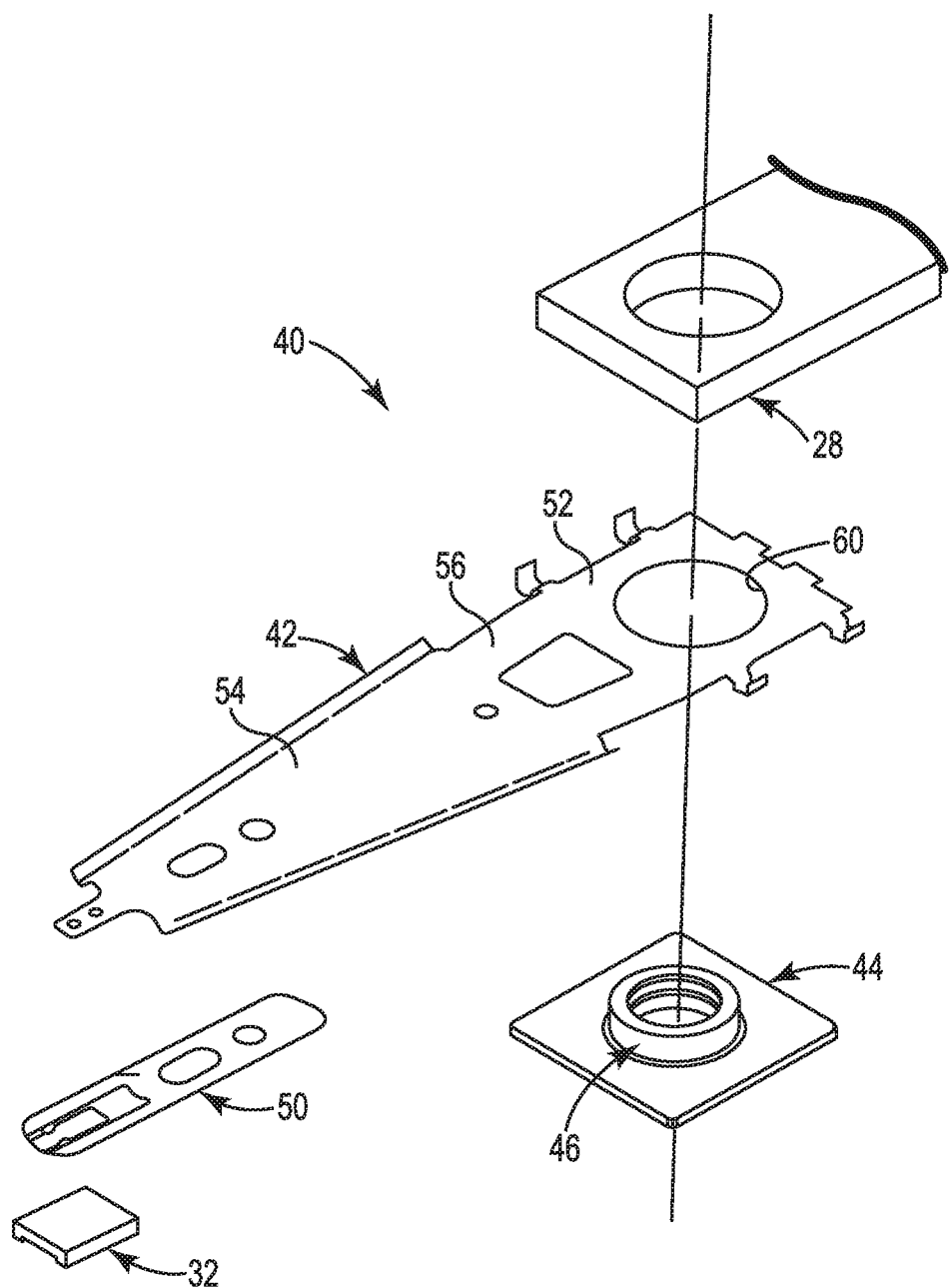
FIG. 2 is a perspective view of an exploded head stack assembly of the type that can be used in an HDD system, such as the system illustrated in FIG. 1.

In order to better illustrate sliders and associated components of the type discussed herein relative to the invention, FIG. 2 provides an exploded, perspective view of a typical head stack assembly (HSA) 40 of FIG. 1, which includes a load beam 42, actuator arm 28, and a base plate 44 with an upwardly projecting boss tower 46. In the illustrated embodiment, HSA 40 includes a flexure piece 50 to which slider 32 (which includes a transducing or read/write head) is mountable. Flexure 50 may be attached to load beam 42 by any conventional mechanism or may be integral with load beam 42. In some embodiments, load beam 42, flexure 50 and slider 32 can be referred to as a head suspension assembly. Load beam 42 includes a mounting region 52 at a proximal end, a rigid region 54 adjacent to the distal end of the load beam 42, and a spring region 56 between the mounting region 52 and rigid region 54. An aperture 60 is extends through the mounting region 52. Spring region 56 is relatively resilient and provides a downward bias force at the distal tip of load beam 42 for holding the slider 32 with read/write head near a spinning disk in opposition to an upward force created by the air bearing over the disk. HSA 40 is typically coupled to actuation motor 26 of the type illustrated in FIG. 1, for example, via actuator arm 28 that is attached to mounting region 52 of load beam 42.

The read/write heads described above are carried by a slider that is used to read from and write to a data track on a disk. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

In accordance with methods of the invention, an exemplary thermal interconnect process is provided in which two separate steps are used to apply a laser solder jetting pulse and solder reflow pulse to each solder sphere. Such methods allow for fine tuning of the thermal interconnect process by having the capability of adjusting the jetting process parameters independently of the energy needed for the reflow process (i.e., the process that occurs when the solder begins to create the joint between a slider and trace gimbal assembly). In this way, the life of the capillary from which the solder sphere is released can be increased, and the yield of a particular thermal interconnect process can also be improved.

The solder dispensing and thermal interconnect process of the invention can include one or more lasers (e.g., coaxial lasers) which heat a dispensed solder sphere that has been captured by a tapered capillary. In this process, a solder sphere is released from a solder sphere dispenser into a central opening of a capillary that has one or more tapered walls or a tapered wall around its perimeter. The capillary is subjected to a higher pressure than ambient conditions, which can result in a net flow of gas out of the system when open to push the solder sphere into the capillary outlet. After the solder sphere is positioned to block the outlet of the capillary, the pressure increases while the interior pressure of the capillary is monitored by a pressure gauge. Once a predetermined pressure value is reached, a signal is sent to a laser generator to provide a jetting pulse to the solder sphere. The jetting pulse is provided as a laser that is applied through the central opening of the capillary to the solder sphere. This jetting pulse can generally be sufficient to provide a level of thermal energy needed to at least partially liquefy or melt the solder sphere and force it out of the capillary outlet. In one embodiment, the amount of energy applied to the solder sphere is limited to the amount that is sufficient to cause the sphere to melt, but not so high that the solder material is completely in a liquid state (often referred to as the mushy state), after it moves away from the capillary outlet. Once the solder material exits the capillary, it begins to travel towards the target surface(s), during which time it can at become at least partially solidified.

The method then further includes determining that the solder material has exited the capillary (and/or the location of the solder material) using one or more different approaches, and then triggering a second laser pulse. This pulse is applied to the solder material (which at this point can be at least partially solidified) to provide the thermal energy necessary to reflow the solder onto the target surface(s). This second pulse is separated temporally from the jetting pulse and provides the thermal energy needed to reflow the solder material either as it travels from the capillary to the target surface(s), or after it has already arrived at the target surface(s). A number of methods can be used to detect the solder material and trigger the reflow pulse, in accordance with the invention. In addition, the amount of time between the jetting pulse and the reflow pulse can vary depending on the application. For example, the pulses can be separated by a detectable length of time, or the pulses can be so close in time that they overlap and thus could be considered one single pulse of varying intensities. Therefore, although the description process is simpler to describe with a time gap between pulses, it is also contemplated that there is no discernable time gap between the pulses.

In more particularity, the jetting pulse of a multiple pulse system of the invention can be tuned to heat the solder sphere exactly to its melting point or just slightly above its melting point. This limits the amount of heat conducted to the capillary, since the temperature of the solder sphere will be lower than if reflow is also being facilitated by this jetting pulse. As the solder sphere leaves the capillary and travels through the air to the target surface(s), or after the sphere has reached its target surface(s), the second or reflow pulse is applied to the solder material to provide the energy necessary to reflow the solder. This allows the user to customize the reflow process, such as by taking into consideration varying thermal conductivity and heat capacity of the device into order to provide desired properties to the connection (e.g., a predetermined size, shape, and/or other properties for the solder joint). In embodiments of the invention, this two-step process minimizes or eliminates the effect of the change the aspect ratio of the molten, or semi-molten sphere during impact with substrate. This is often referred to as "splat" of the solder material onto components such as a slider and trace gimbal assembly, since the material that reaches the target location is not necessarily in a pure liquid form.

In accordance with the invention, when multiple pulses are applied to a single solder sphere, each of the pulses can be provided by a single source that is tuned to the same or different intensities for jetting and reflow. Alternatively, the pulses can be provided by different laser sources of either different or identical wavelengths for both jetting and reflow.

Referring now to FIGS. 3A-3F, schematic views of multiple steps of an exemplary method of the invention are illustrated for electrically connecting two orthogonal elements, such as a slider 100 and a trace gimbal assembly 102. These elements are generally associated with or extend from other elements of a hard disk drive components, wherein only a distal portion of such elements of are shown for clarity of illustration purposes. These components are attachable to each other using solder material that is provided to the soldering area 104 in the area where the slider 100 and trace gimbal assembly 102 are closest to each other.

A capillary 104 is positioned above the slider 100 and gimbal assembly 102 such that solder material exiting the capillary will fall toward two components that are to be electrically connected to each other. The capillary 104 can have a wide variety of different sizes and shapes; however, an embodiment of the capillary 104 used in the methods of the invention can include a structure that includes a center opening that is at least partially surrounded by walls that are sloped or tapered from the area in which a solder sphere enters the capillary to the area where the solder sphere exits the capillary. That is, the capillary 104 is substantially conic with a hollow inner area. The capillary 104 further includes a capillary pressure monitor 106.

The capillary 104 includes a central opening 105 that is positioned such that its longitudinal axis is directly above the area onto which it is desired to deposit solder material. In this way, the solder sphere uses gravity, in addition to the pressure that is pushing the solder sphere from the capillary, to move the solder sphere 108 to its target location. In an embodiment where the target surfaces (e.g., surfaces of slider 100 and trace gimbal assembly 102) are perpendicular to each other, the angle between the longitudinal axis of the central opening 104 of the capillary 105 and the target surfaces will be approximately 45 degrees.

As is illustrated in FIG. 3A, a solder sphere 108 is provided to the capillary 104 from a solder sphere source or reservoir (not shown), wherein the solder sphere material, size, shape, and the like are selected to provide a desired connection between components once the solder material is placed and formed in a target location. Pressure is applied to the capillary 104, such as with a pressurization gas depicted schematically with arrows 120 as pressing downwardly against the solder sphere 108 until it is positioned at the outlet of the capillary 104, as is shown in FIG. 3B. Continued pressure is applied, which thereby increases the pressure within the capillary 104, as is being monitored by the pressure monitor 106.

Once the pressure is applied for a predetermined amount of time, a first laser pulse or jetting pulse 110 is directed to the solder sphere 108, as is illustrated schematically in FIG. 3C. The jetting pulse 110 can be directed generally along a longitudinal axis that extends vertically from the center opening 105 of the capillary 104 and in a downward direction. The amount of energy provided by this jetting pulse can be sufficient in an embodiment to bring the material of the solder sphere up to its semi-molten temperature. After the jetting pulse is applied, the solder sphere 108, which has been softened by the laser and is under pressure, can exit from the outlet of the capillary 104 as a semi-molten solder material, as is illustrated in FIG. 3D. As the sphere 108 moves toward the surfaces of the slider 100 and trace gimbal assembly 102, the amount of time that has elapsed since the application of the jetting pulse to the solder sphere 108 is being measured. After a predetermined amount of time has passed, a second or reflow pulse 112 is directed to the solder sphere 108, which can be in generally the same direction as the jetting pulse that was applied to the solder sphere 108 (i.e., in a downward direction toward the outlet of the capillary), as is illustrated schematically by FIG. 3E. Thus, a simple fixed time delay after the jetting pulse is applied is the trigger for the separate reflow pulse to take place. The amount of energy provided by the reflow pulse 112 is sufficient to reflow the solder sphere and create a strong bond between components, as is shown in FIG. 3F, for example.

The jetting pulse 110 and the reflow pulse 112 can have the same or different properties, such as the laser strength, the direction at which the pulse is applied, and the like. The separate pulses can be provided by the same or a different source, although both pulses can be provided along the same general co-axial path to the solder sphere.

In another embodiment of a method of the invention, rather than waiting for a predetermined amount of time before applying the jetting pulse, as in the method described above, the jetting pulse is instead triggered by achieving a certain pressure in the capillary. That is, once a particular level of pressure is recorded by the pressure monitor 106, a first laser pulse or jetting pulse 110 is directed to the solder sphere 108, as is illustrated schematically in FIG. 3C.

In another embodiment of a step of the invention, which may be used in combination with any of the methods described herein for triggering of the reflow pulse, the internal capillary pressure is used to monitor the depressurization of the system as the solder sphere exits the capillary. After a threshold value is reached, this information is used to then trigger the reflow pulse or alter the laser intensity, as is illustrated schematically in FIG. 3E, for example.

FIGS. 4A-4E illustrate another embodiment of a method of the invention. In this method, a solder sphere 208 is provided to a capillary 204 from a solder sphere source or reservoir (not shown), wherein the solder sphere material, size, shape, and the like are selected to provide a desired connection between components once the solder material is placed and formed in a target location. Pressure is applied to the capillary 204, such as with a pressurization gas depicted schematically with arrows 220 as pressing downwardly against the solder sphere 208 until it is positioned at the outlet of the capillary 204, as is shown in FIG. 4B. Continued pressure is applied, which thereby increases the pressure within the capillary 204, as is being monitored by the pressure monitor 206. Once a particular level of pressure is recorded by the pressure monitor 206, a first laser pulse or jetting pulse 210 is directed to the solder sphere 208, as is illustrated schematically in FIG. 4C. During this time, the intensity of the primary beam 212 is reduced to produce scattered light from the solder sphere surface. Then, a wavelength specific or broad spectrum photodetector 230 is used to detect the scattered light and indicate when the solder sphere 208 exits the capillary 204. This detection of the solder sphere 208 by the photodetector can then trigger a reflow laser or pulse 240 following a specified time delay, as is illustrated in FIG. 4E.

FIGS. 5A-5E illustrate another embodiment of a method of the invention. In this method, a solder sphere 308 is provided to a capillary 304 from a solder sphere source or reservoir (not shown), wherein the solder sphere material, size, shape, and the like are selected to provide a desired connection between components once the solder material is placed and formed in a target location. Pressure is applied, which thereby increases the pressure within the capillary 304, as is being monitored by the pressure monitor 306. Once a particular level of pressure is recorded by the pressure monitor 306, a first laser pulse or jetting pulse 310 is directed to the solder sphere 308, as is illustrated schematically in FIG. 5C. During this time, a separate coaxial low intensity beam 312 having a different wavelength than other lasers of the system is used to illuminate the solder sphere 308. In this way, as the solder sphere 308 exits the capillary, it will scatter light of the surface of the solder sphere 308. Then, a wavelength specific photodetector 330 is used to detect when the solder sphere 308 exits the capillary 304. This detection of the solder sphere 308 by the photodetector can then trigger a reflow laser or pulse 340 following a specified time delay, as is illustrated in FIG. 5E. The photodetector 330 then monitors for scattered light of the solder sphere as it exits the capillary 304. After a threshold level of light is detected, a specified time delay will trigger the reflow pulse.

FIGS. 6A-6E illustrate another embodiment of a method of the invention. In this method, a solder sphere 408 is provided to a capillary 404 from a solder sphere source or reservoir (not shown), wherein the solder sphere material, size, shape, and the like are selected to provide a desired connection between components once the solder material is placed and formed in a target location. Pressure is applied (shown schematically by arrows 420), which thereby increases the pressure within the capillary 404, as is being monitored by the pressure monitor 406. Once a particular level of pressure is detected by the pressure monitor 406, a first laser pulse or jetting pulse 410 is directed to the solder sphere 408, as is illustrated schematically in FIG. 6C. The jetting pulse 410 can be directed generally along a longitudinal axis that extends vertically from the center opening 405 of the capillary 404 and in a downward direction. The amount of energy provided by this jetting pulse can be sufficient in an embodiment to bring the material of the solder sphere up to its semi-molten temperature.

After the jetting pulse is applied, the solder sphere 408, which has been softened by the laser and is under pressure, can exit from the outlet of the capillary 404 as a semi-molten solder material, as is illustrated in FIG. 6D. As the sphere 408 moves toward the surfaces of a slider and trace gimbal assembly, the amount of time that has elapsed since the application of the jetting pulse to the solder sphere 408 is being measured. After a predetermined amount of time has passed, the jetting pulse 410 will change in intensity while still directed to the solder sphere 408. Importantly, with this embodiment, the length of time between the higher intensity portion of the pulse and the lower intensity portion of the pulse can be shorter than the length of the pulse itself, thereby essentially providing a single pulse with varying intensity. Thus, a fixed time delay after the original jetting pulse is applied is the trigger for changing the intensity of the pulse to cause the reflow. The amount of energy provided by the reflow pulse is sufficient to reflow the solder sphere and create a strong bond between components.

FIGS. 7A and 7B illustrate another embodiment of a method of the invention, which includes first and second components that are arranged differently relative to each other from the other embodiments described above. In particular, this method includes a first component 700 positioned so that one of its planar surfaces is in contact with a planar surface of a second component 702. The first component 700 includes an aperture or hole 704 that extends from its top surface 706 to its bottom surface 708. A top surface 710 of the second component 702 is positioned so that it is immediately below the aperture 704 and in contact with the area of the bottom surface 708 that is adjacent to the aperture 704.

As is further illustrated in FIG. 7A, a solder sphere 720 is illustrated to be moving downwardly and toward the first and second components 700, 702. In particular, the sphere 720 is falling toward the aperture 704. This solder sphere 720 can be provided by any of the solder dispensing and thermal interconnect process embodiments described herein, wherein one or more lasers heat a dispensed solder sphere that has been captured by a tapered capillary (not illustrated). As set out above, the increase in pressure provided to the capillary is monitored until a predetermined pressure value is reached, after which a signal is sent to provide a jetting pulse to the solder sphere 720. The solder sphere 720 is thereby at least partially liquefied or melted to force it out of the capillary outlet. The solder sphere 720 may become more solid as it cools and travels toward the aperture 704. Then, in accordance with the invention, the method includes using process information relative to the exit of the sphere 720 from the capillary to trigger a second laser pulse, which provides the thermal energy needed to reflow the solder immediately prior to it reaching the aperture 704 of the first component 700. This second laser pulse is separated temporally from the first or jetting pulse, and provides the thermal energy needed to reflow the solder material either as it travels from the capillary to the target surface, or after it has already arrived at the target surface.

As is discussed above relative to other embodiments of the invention, a number of methods can be used to detect the solder material as it exits the capillary and trigger the reflow pulse. The amount of time between the jetting pulse and the reflow pulse can be adjusted and controlled, depending on the application. For example, the pulses can be separated by a detectable length of time, or the pulses can be so close in time that they overlap and thus could be considered one single pulse of varying intensities. In any case, the solder sphere 720 is subjected to sufficient laser energy by the reflow pulse for the solder material to enter the aperture 704 and contact the top surface 710 of the second component 702. As shown, because the solder material at least partially fills the aperture 704 and extends to contact the top surface 710 of the second component 702, once the solder material cools and hardens, the first and second components 700, 702 will be connected to each other via the solder material.

With any of the methods described herein, it is contemplated that the laser providing the jetting pulse and the laser providing the reflow pulse are coaxial or non-coaxial or the same laser. In addition, in the methods that involve photo detection, it is contemplated that the solder sphere is detected using differing techniques, such as a thermal camera, for example.

The present invention has now been described with reference to several embodiments thereof The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of interconnecting multiple components of an electrical assembly with a solder joint, comprising the steps of:
   positioning a first component adjacent to a second component to provide a connection area between the first and second components;
   dispensing a solder sphere to a capillary tube comprising tapered walls, wherein the capillary tube is positioned with an exit orifice above the connection area between the first and second components, and wherein the solder sphere moves to the exit orifice after it has been dispensed;
   pressurizing the capillary tube prior to the application of any laser energy with the solder sphere positioned at the exit orifice until a predetermined pressure is reached;
   applying a first laser pulse to the solder sphere after the predetermined pressure has been reached to provide a level of thermal energy to liquefy the solder sphere until it becomes a semi-molten solder material and falls from the exit orifice toward the connection area between the first and second components;
   detecting the movement of the semi-molten solder material with a photodetector to generate information of when it has exited the exit orifice of the capillary tube; and
   using the generated information to trigger a second laser pulse to reflow the solder material to create the solder joint between the first and second components, wherein the application of the second laser pulse comprises changing an intensity of the first laser pulse.

2. The method of claim 1, wherein the electrical assembly comprises a head-gimbal assembly, wherein the first component comprises a slider, and wherein the second component comprises a trace gimbal assembly.

3. The method of claim 1, wherein the first and second laser pulses are provided by one of coaxial and non-coaxial lasers.

4. The method of claim 1, wherein the first and second laser pulses are provided by varying the intensity of a single laser.

5. The method of claim 1, wherein the capillary tube comprises a central opening surrounded by tapered side walls.

6. The method of claim 1, wherein the first component is positioned at an angle relative to the second component.

7. The method of claim 1, wherein the first component comprises a first surface, a second surface, and an aperture extending from the first surface to the second surface of the first component, wherein the second component comprises a first surface and a second surface, wherein the step of positioning the first component adjacent to the second component comprises positioning the first surface of the second component adjacent to the second surface of the first component, and wherein the step of dispensing the solder sphere further comprises the exit orifice of the capillary tube being positioned above the aperture of the first component.

8. The method of claim 1, wherein the photodetector comprises a wavelength specific or broad spectrum photodetector.

* * * * *